March 25, 1947.   H. F. SCHMIDT   2,417,887
PISTON AND CYLINDER CONSTRUCTION
Filed April 26, 1945
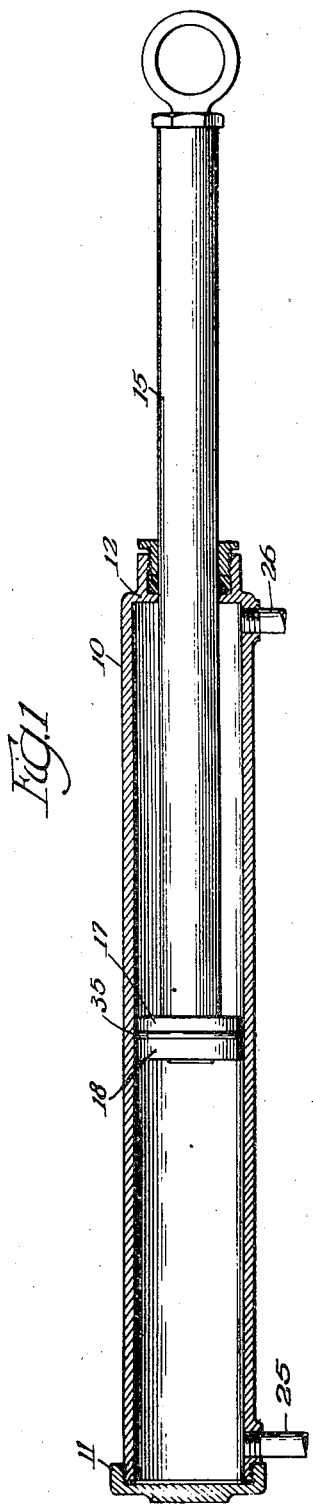
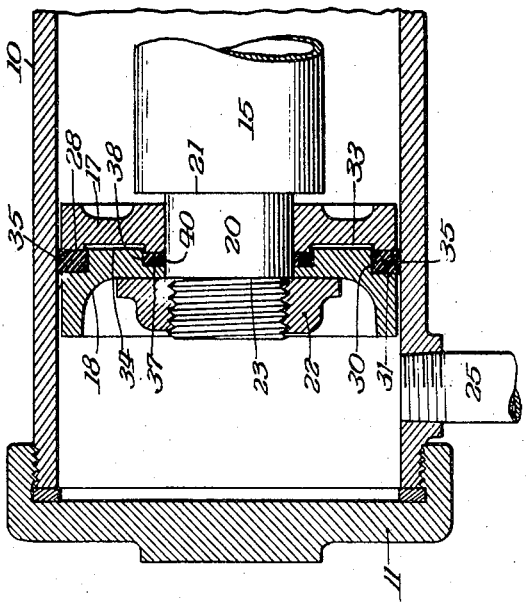
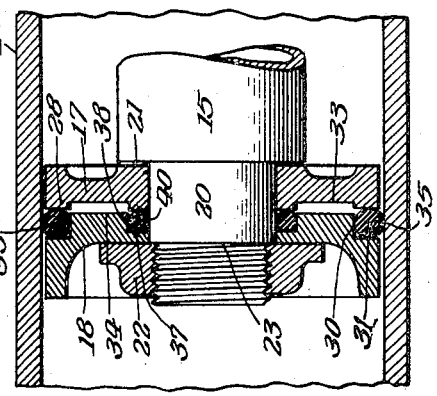
Inventor
Howard F. Schmidt
By Fred Gerlach
his Atty Patented Mar. 25, 1947

2,417,887

UNITED STATES PATENT OFFICE 2,417,887

PISTON AND CYLINDER CONSTRUCTION

Howard F. Schmidt, San Diego, Calif., assignor to Consolidated Vultee Aircraft Corporation, San Diego, Calif.

Application April 26, 1945, Serial No. 590,337

4 Claims. (Cl. 309—4)

The invention relates to hydraulic devices for actuating elements between alternate positions such, for example, as airplane control mechanisms.

In hydraulic devices or jacks used for actuating mechanisms, particularly in aircraft, which comprise a piston operable by fluid under pressure in opposite directions in a cylinder, it is desirable to prevent the loss of operating pressure at the ends of the piston-strokes for maintaining maximum efficiency in holding the device in its alternative positions. When the piston is equipped with packing rings of the fixed compression type, they cause excessive friction between the piston and cylinder-wall during the entire piston strokes which results in retardation in the operation of the pistons. In practice, it has been found that loss of fluid pressure by leakage around the piston occurs mainly at the ends of the strokes of the piston when the actuated device has completed its cycle of operation and is retained in one of its alternative positions by the fluid pressure against the piston. It has also been found that rings, which are subjected to wedging expansion during the entire piston strokes, produce objectionable retardation to the operation of the actuated device by the piston. This object is attained primarily by providing a piston comprising relatively movable sections on a stem which is connected to the device to be actuated and an elastic packing-ring, the ring and ring-engaging portions of the piston-sections having cross-sectional contours, for example, circular and rectangular, whereby the ring will be deformed to apply friction of low magnitude to the cylinder between the ends of the piston strokes and will be deformed so its outer portion will be expanded outwardly to produce a greater degree of friction on the cylinder at the ends of the piston strokes.

One object of the invention is to provide improved packing or sealing means between the piston and the cylinder which produces relatively low friction between them and less resistance to the movement of the piston during travel of the piston between the ends of its strokes and a substantially greater friction between the pistons and cylinders at the ends of the piston strokes while the element actuated by the piston is hydraulically retained in one of its alternative positions.

Another object of the invention is to provide a hydraulic device in which the piston is equipped with a packing ring or rings which produce differential friction at the ends and intermediate portions of the piston strokes for efficient operation and without loss of fluid pressure.

Other objects of the invention will appear from the detailed description.

The invention consists in the several features hereinafter set forth and more particularly defined by claims at the conclusion hereof.

In the drawings:

Fig. 1 is a longitudinal section of hydraulic jack, the piston being shown in elevation.

Fig. 2 is a longitudinal section on a larger scale illustrating the piston during an intermediate portion of its stroke.

Fig. 3 is a similar view illustrating the piston at the end of its stroke.

The invention is exemplified in a hydraulic jack which comprises a cylinder 10 which is provided at one end with a head 11 and at its other end with a head 12. Pipes 25, 26 are connected to the cylinder adjacent its opposite ends for alternately admitting fluid under pressure and simultaneously exhausting fluid from the opposite ends of the cylinder. A piston is slidable in the cylinder and is carried by a stem 15 which extends through head 12 for connection to a device to be actuated such, for example, as a control device on an airplane. Such connections are well understood in the art and are usually operable to shift the actuated element between two alternative positions in which they are held by the fluid under pressure in the opposite ends of the cylinder, respectively.

The piston comprises a pair of disk-like sections 17, 18 which have a limited sliding movement on a reduced portion 20 of the stem 15 between a shoulder 21 on the stem and a nut 22 which is screw-threaded to the end of stem 15 and seated on a shoulder 23. The piston-sections 17, 18 are slidable on the stem 15 and relatively to each other. Piston-section 17 is provided on its inner side adjacent its periphery with an annular face 28. Piston-section 18 is provided adjacent its periphery with an annular groove having an inner cylindrical side or peripheral face 30 which is parallel to the axis of the piston-stem 15 and a side-face 31 which is parallel to face 28. Faces 30, 31 in cross-section extend at right angles to each other. Inwardly of face 30, a recess 33 is formed in the inner face of piston-section 17, and piston-section 18 is formed with a face 34 which is adapted to extend into recess 33. The groove forming-faces 30, 31 on piston-section 18 and the face 28 on piston-section 17 form in effect a groove which is rectangular in cross-section with parallel sides. An elastic packing ring 35 which is normally substantially circular in cross-section, is confined in the rectangular groove formed by the face 28 on piston-section 17 and the faces 30, 31 on piston-section 18 and its outer portion engages the cylinder. As a result of the rectangular cross-sectional contour of the groove and the circular cross-sectional contour of the ring 35 spaces are left in the groove into which the ring can be distorted by pressure applied to the ring by the piston-sections 17, 18 before its outer portion is expanded to substantially increase its pressure against the cylinder. The elastic ring 35 has a sufficient density or co-efficient of elasticity to retain approximately its circular cross-sectional contour or be deformed into the space in the groove during the application of the normal load so that the friction or pressure of the ring on the cylinder will be sufficient to prevent the flow of fluid from one side of the piston to the other without substantial increase of friction against the cylinder or retardation to the movement of the piston in the cylinder between the ends of the piston strokes. When the load on the piston is increased at the end of its strokes, which occurs when the actuated element has been shifted to one of its alternative positions, the increased pressure on the piston will deform the ring to fill the groove in which it is held and also expand its outer portion to exert a substantially greater pressure against the cylinder. This increased pressure of the elastic ring against the cylinder will positively prevent any leakage around the piston and the ring will be maintained expanded while the piston remains held by fluid under pressure at the end of its strokes. A similar differentially acting packing is provided between the piston-sections 17, 18 and the piston-stem 15. Piston-section 18 is provided around the piston-stem 15 with an annular groove which is right angle in cross-section and includes a straight side face 37 and a cylindrical periphery 38, and piston-section 17 is provided with an annular face 39 which is substantially parallel to the face 37. These faces with the piston-stem 15 form a substantially rectangular groove in which an elastic ring 40 is confined. Ring 40 is normally circular in cross-section and is of sufficient density to retain approximately its normal cross-sectional shape during the normal loading of the piston between the ends of its strokes. At the end of the piston strokes, the increased load will force the piston-sections 17, 18 together sufficiently to deform the ring 40 to fill said rectangular groove so that the portion which engages the piston-stem 15 will be forced with greater pressure against the stem and prevent leakage through the piston.

In the operation of the piston in one direction by fluid under pressure entering the cylinder 10 through pipe 25 and simultaneously exhausting it from the other end of the cylinder through pipe 26, the normal load on the piston will be such that its pressure against piston-section 17 will engage packing rings 35 and 40 without sufficient deformation of said rings between piston-sections 17, 18 to substantially increase the friction between packing-ring 35 and the cylinder 10, and between packing-ring 40 and the piston-stem 15. The low degree of friction between cylinder 10 and ring 35 results in low retardation to the movement of the piston. As the piston reaches the end of its leftward stroke, the load on the piston-stem 15 will be greatly increased by the stoppage of the actuated device. The increased pressure exerted against piston-section 17 will deform the elastic ring 35 so it will fill the groove in piston-section 18 and between said piston-sections, and expand the outer portion of said ring firmly against the inner periphery of the cylinder 10 to substantially lock the piston in the cylinder by said friction. During the same cycle of movement, ring 40 will operate in like manner and prevent leakage between the piston-stem 15 and the piston-section from one end of the cylinder to the other. The pressure is usually retained in the cylinder to hold the actuated element in one of its alternative positions, and the action of the packing-rings above-described will maintain an effective seal between the piston and cylinder and the piston and its stem. When the element is to be actuated in the opposite direction, fluid under pressure will be admitted to the cylinder through pipe 26, and simultaneously exhausted through pipe 25. Between the ends of the rightward stroke, the piston-rings 35, 40 will operate as before described to exert a low degree of friction between the piston and the cylinder and between the piston and its stem. When the piston reaches the end of its rightward stroke, the increased load on the piston will cause rings 35, 40 to be deformed to fill the grooves in which they are confined, so the pressure of ring 35 against the cylinder and the pressure of ring 40 against the piston-stem will be increased in the same manner before described.

The invention exemplifies a hydraulic actuating device including a piston and a cylinder operable in opposite directions by fluid under pressure in which the piston is formed of sections, and an elastic packing-ring is operative to exert relatively slight friction against the cylinder during the normal operating load between the ends of the piston strokes, and to exert substantial locking engagement between the piston and the cylinder while fluid remains under pressure in one end of the cylinder, and a similarly operative elastic packing-ring between the piston-sections and the piston-stem.

While the invention has been exemplified with a piston on a stem extending through one end of the cylinder, it will be obvious that the stem may be extended through the other end or through both ends of the cylinder.

The invention is not to be understood as limited to the details described, since these may be modified within the scope of the appended claims without departing from the spirit and scope of the invention.

Having thus described the invention, what I claim as new and desire to secure by Letters Patent is:

1. The combination with a cylinder provided with connections for fluid to and from its opposite ends, of a piston slidable in opposite directions in the cylinder by fluid under pressure alternately delivered to the opposite ends of the cylinder, comprising, a piston-stem extending through one end of the cylinder for connection to a device to be actuated, a pair of piston-sections slidably mounted on the stem for limited movement thereon and relatively to each other, having confronting faces provided with means forming peripheral grooves between them, around their outer periphery and around the stem, respectively, and elastic rings in said grooves, the rings normally and the grooves having relative cross-sectional contours which form spaces around the rings, the rings having sufficient density to prevent expansion by the sections when the piston is under normal load between the ends of its strokes and being distortable by the sections to substantially fill the groove and be expanded for a substantial increase of friction between the ring and cylinder when the piston reaches the ends of its strokes and is loaded against further movement.

2. The combination with a cylinder provided with connections for fluid to and from its opposite ends, of a piston slidable in opposite directions in the cylinder by fluid under pressure alternately delivered to the opposite ends of the cylinder and comprising a piston-stem extending through one end of the cylinder for connection to a device to be actuated, and a pair of piston sections slidably mounted on the stem for limited movement thereon and relatively to each other and having faces forming a substantially parallel-sided peripheral groove between them, and an elastic ring in said groove, having a cross-sectional contour which normally leaves a space in the groove and around the ring, the ring having sufficient density to prevent substantial expansion by the sections when the piston is under normal load between the ends of its strokes and being distortable by the sides of the groove to substantially fill the groove and expansible for a substantial increase of friction between the ring and the cylinder when the piston reaches the ends of its strokes and is loaded against further movement.

3. The combination with a cylinder provided with connections for fluid to and from its opposite ends, of a piston slidable in opposite directions in the cylinder by fluid under pressure alternately delivered to the opposite ends of the cylinder and comprising a piston-stem extending through one end of the cylinder for connection to a device to be actuated, and a pair of piston sections slidably mounted on the stem for limited movement thereon and relatively to each other and having faces forming a pair of substantially parallel-sided peripheral grooves between them, said grooves being disposed at the outer and inner peripheries of the piston, respectively, and elastic rings in the grooves, respectively, each being of substantially circular cross-sectional contour which leaves a space in its groove and around the ring therein, each ring having sufficient density to prevent substantial expansion by the sections when the piston is under normal load between the ends of its strokes and being distortable by the sides of the grooves to substantially fill them and being expansible for a substantial increase of friction between the rings and the cylinder and the stem, respectively, when the piston reaches the ends of its strokes and is loaded against further movement.

4. The combination with a cylinder provided with connections for fluid to and from its opposite ends, of a piston slidable in opposite directions in the cylinder by fluid under pressure alternately delivered to the opposite ends of the cylinder and comprising a piston-stem extending through one end of the cylinder for connection to a device to be actuated, and a pair of piston sections slidably mounted on the stem for limited movement thereon and relatively to each other and having faces forming between them a peripheral groove with substantially parallel sides and a straight bottom, and an elastic ring in said groove of substantially circular cross-sectional contour which normally leaves a space in the groove and around the ring, the ring having sufficient density to prevent substantial expansion by the sections when the piston is under normal load between the ends of its strokes and being distortable by the sides of the groove to substantially fill the groove and being expansible for a substantial increase of friction between the ring and the cylinder when the piston reaches the ends of its strokes and is loaded against further movement.

HOWARD F. SCHMIDT.

REFERENCES CITED

The following references are of record in the file of this patent:

UNITED STATES PATENTS

| Number | Name | Date |
|---|---|---|
| 1,947,701 | Farmer | Feb. 20, 1934 |
| 2,045,177 | Dean | June 23, 1936 |
| 2,352,041 | Vandenberg | June 20, 1944 |
| 961,080 | Adams | June 7, 1910 |
| 1,031,739 | Stallman | July 9, 1912 |
| 2,157,039 | Van Hooydonk | May 2, 1939 |
| 277,764 | McKenna | May 15, 1883 |
| 996,680 | Schiller | July 4, 1911 |
| 1,481,160 | Switzer | Jan. 15, 1924 |

FOREIGN PATENTS

| Number | Country | Date |
|---|---|---|
| 485,112 | France | 1917 |
| 593,757 | France | 1925 |